United States Patent
Sugasawa (10) Patent No.: US 7,441,127 B2
(45) Date of Patent: Oct. 21, 2008

(54) POWER CONTROLLER AND POWER CONTROL METHOD FOR A PORTABLE CONTENTS PLAYER

(75) Inventor: Masashi Sugasawa, Chiba (JP)

(73) Assignee: Sony Corporation, Tokyo (JP)

( * ) Notice: Subject to any disclaimer, the term of this patent is extended or adjusted under 35 U.S.C. 154(b) by 404 days.

(21) Appl. No.: 11/113,526

(22) Filed: Apr. 25, 2005

(65) Prior Publication Data
US 2005/0240784 A1 Oct. 27, 2005

(30) Foreign Application Priority Data
Apr. 27, 2004 (JP) ............ P2004-131503

(51) Int. Cl.
- G06F 1/00 (2006.01)
- G06F 1/32 (2006.01)
- G06F 11/30 (2006.01)

(52) U.S. Cl. .......... 713/300; 713/320; 713/340
(58) Field of Classification Search .......... 713/300, 713/320, 322, 340; 386/124
See application file for complete search history.

(56) References Cited

U.S. PATENT DOCUMENTS

| | | | |
|---|---|---|---|
| 6,622,252 B1 * | 9/2003 | Klaassen et al. | 713/320 |
| 6,665,810 B1 * | 12/2003 | Sakai | 713/600 |
| 7,000,134 B2 * | 2/2006 | Tsukihashi | 713/340 |
| 2002/0171980 A1 * | 11/2002 | Tsukihashi | 360/220 |
| 2002/0172115 A1 * | 11/2002 | Tsukihashi | 369/53.18 |
| 2005/0008344 A1 * | 1/2005 | Crohas | 386/124 |
| 2005/0016364 A1 * | 1/2005 | Kamiya | 84/627 |

FOREIGN PATENT DOCUMENTS

| | | |
|---|---|---|
| JP | 09-034646 | 2/1997 |
| JP | 2001-142580 | 5/2001 |
| JP | 2001-312338 | 11/2001 |
| JP | 2002-202856 | 7/2002 |
| JP | 2002-312081 | 10/2002 |
| JP | 2003-029885 | 1/2003 |
| JP | 2004-118343 | 4/2004 |

* cited by examiner

Primary Examiner—Suresh K Suryawanshi
(74) Attorney, Agent, or Firm—Finnegan, Henderson, Farabow, Garrett & Dunner, L.L.P.

(57) ABSTRACT

A power controller includes a power detector detecting supply of first power given a predetermined power level and second power given a power level lower than the first power, a supply power switch supplying a storage with the first power when the power detector detects supply of the first power and supplying the storage with the second power switching from the first power to the second power when the power detector detects supply of the second power only, and a data transfer rate controller setting a data transfer rate between a predetermined data transfer source/destination and the storage to a second data transfer rate lower than a first data transfer rate coupled with the supply of the first power when supply of the second power only is detected, to reduce power consumption of the storage in comparison to power consumed by a data transfer at the first data transfer rate.

9 Claims, 7 Drawing Sheets

POWER CONTROLLER AND POWER CONTROL METHOD FOR A PORTABLE CONTENTS PLAYER

CROSS REFERENCE TO RELATED APPLICATIONS

The present invention contains subject matter related to Japanese Patent Application JP 2004-131503 filed in the Japanese Patent Office on Apr. 27, 2004, the entire contents of which being incorporated herein by reference.

BACKGROUND OF THE INVENTION

1. Field of the Invention

The present invention relates to a power controller and a power control method and, more particularly, is suitably applied to a portable contents player that reads out and reproduces contents stored in a hard disk drive.

2. Description of the Related Art

A recent portable contents player uses a semiconductor memory as a storage means, and the adoption of an internal battery power to read out and reproduce the contents stored in the semiconductor memory supports the portability of the player.

For the acquisition of contents data transferred from an external host Personal Computer (PC), a portable contents player is generally connected to the host PC through a Universal Serial Bus (USB) cable.

Some portable contents players perform a data transfer with USB power only supplied from a host PC through a USB cable. Such portable contents players generally do not require external power source such as an AC adapter, and preserve the battery power of the internal battery (dry cell) (refer to, for example, Japanese Patent Laid-open No. 2001-142580 (pages 12 to 13, FIG. 31)).

SUMMARY OF THE INVENTION

There has been a need for increasing the storage capacity of a portable contents player. To meet such a need, recent portable contents players adopt a hard disk drive, as a storage means for storing contents, in place of a semiconductor memory.

In general, a hard disk drive simultaneously performs a constant rotation of the hard disk and a high speed seek of the magnetic head, which results in consuming more power than a semiconductor memory having no moving part.

In some cases, a portable contents player adopting a hard disk drive requires more power than the USB power (5V/500 mA) supplied through a USB cable. In such cases, it may be impossible that the portable contents player is operated with the USB power only.

An embodiment of the present invention provides a power controller and a power control method for performing a data transfer with power given a predetermined power level or less provided from an external source.

A power controller according to an embodiment of the present invention includes: a power detection means for detecting the supply of first power given a predetermined power level and second power given a power level lower than the power level of the first power; a supply power switch means for supplying a storage means for storing data in a storage medium with the first power when the power detection means detects the supply of the first power, and supplying the storage means with the second power after switching power from the first power to the second power when the power detection means detects the supply of the second power only; and a data transfer rate control means for setting a data transfer rate between a predetermined data transfer source or data transfer destination and the storage means to a second data transfer rate lower than a first data transfer rate coupled with the supply of the first power when the supply of the second power only is detected, to thereby reduce power consumption of the storage means in comparison to the power consumed by the data transfer at the first data transfer rate.

With the above configuration, when the supply of the second power only is detected, the data transfer is performed while the second data transfer rate is set for the operation of the storage means with the second power only.

Further, a power control method according to an embodiment of the present invention includes: a power detection step of detecting the supply of first power given a predetermined power level and second power given a power level lower than the power level of the first power; a supply power switch step of supplying a storage means for storing data in a storage medium with the first power when the supply of the first power is detected in the power detection step and supplying the storage means with the second power after switching the power from the first power to the second power when the supply of the second power only is detected in the power detection step; and a data transfer rate control step of setting a data transfer rate between a predetermined data transfer source or data transfer destination and the storage means to a second data transfer rate lower than a first data transfer rate coupled with the supply of the first power when the supply of the second power only is detected, to thereby reduce power consumption of the storage means in comparison to the power consumed by the data transfer at the first data transfer rate.

With the above configuration, when the supply of the second power only is detected, the data transfer is performed while the second data transfer rate is set for the operation of the storage means with the second power only.

According to an embodiment of the present invention, when the supply of the second power only is detected, the data transfer is performed while the second data transfer rate is set for the operation of the storage means with the second power only, so that there is provided a power controller and a power control method for performing a data transfer with power given a predetermined power level or less provided from an external source.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of the present invention will be described below with reference to the accompanying drawings:

(1) Entire Configuration of Data Transfer System

Figure 1:
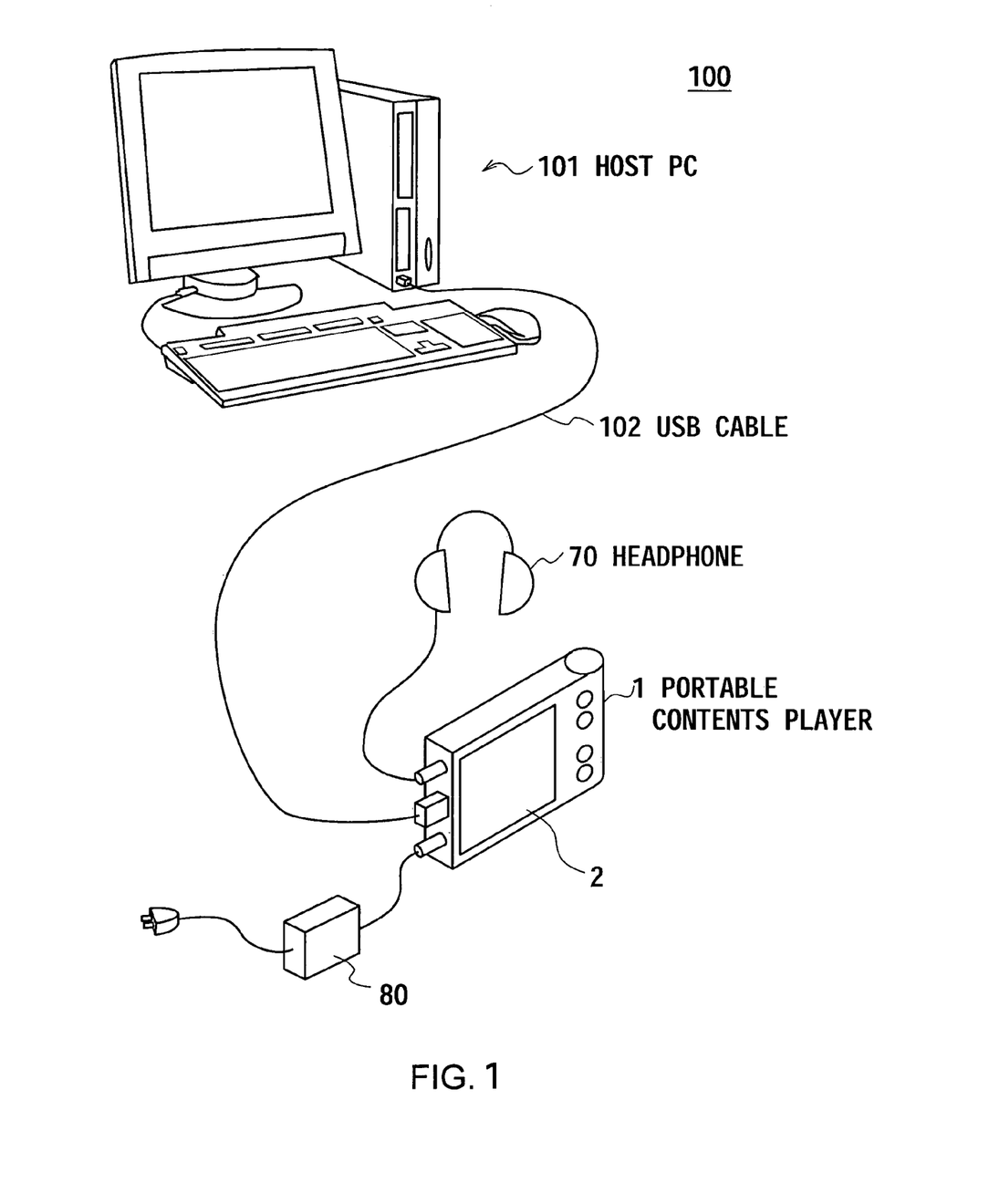
FIG. 1 is a diagram schematically showing the entire configuration of a data transfer system according to an embodiment of the present invention.

In FIG. 1, reference numeral 100 shows the entire configuration of a data transfer system according to an embodiment of the present invention, in which a host Personal Computer (PC) 101 that stores contents therein and a portable contents player 1 that reproduces the contents are connected to each other by means of a Universal Series Bus (USB) cable 102 on the basis of the USB 2.0 specification.

The portable contents player 1 has a plurality of operation modes such as "reproduction mode" in which the player 1 reproduces contents, "USB connection mode" in which the player 1 receives data transferred from the host PC 101, and "waiting mode" in which the player 1 is in neither "reproduction mode" nor "USB connection mode", and switches the modes. When the connection between the portable contents player 1 and host PC 101 has been established through the USB cable 102, the operation mode is automatically switched to "USB connection mode".

The host PC 101 is configured to recognize the portable contents player 1 as an "external storage device", and transfers contents data to the portable contents player 1 in response to a user's operation.

The portable contents player 1 correspondingly stores the contents data transferred from the host PC 101 through the USB cable 102 in a built-in hard disk drive.

At this time, the portable contents player 1 operates with USB power supplied from the host PC 101 through the USB cable 102.

When the USB cable 102 is unplugged, the operation mode of the portable contents player 1 is switched to "reproduction mode", in which the player 1 reads out contents data from the hard disk drive and reproduces the contents data in response to a user's operation.

At this time, the portable contents player 1 operates with an internal battery power, so that a user can carry the player 1 anywhere and freely enjoy reproduction of contents.

The portable contents player 1 is configured to operate with, other than the USB power and internal battery power, power from an Alternating Current (AC) adapter 80 connected to a commercial power source. The portable contents player 1 switches the power according to the connection state of the AC adapter 80, operation mode of the player 1 itself, or the like.

(2) Circuit Configuration of Portable Contents Player 1

Figure 2:
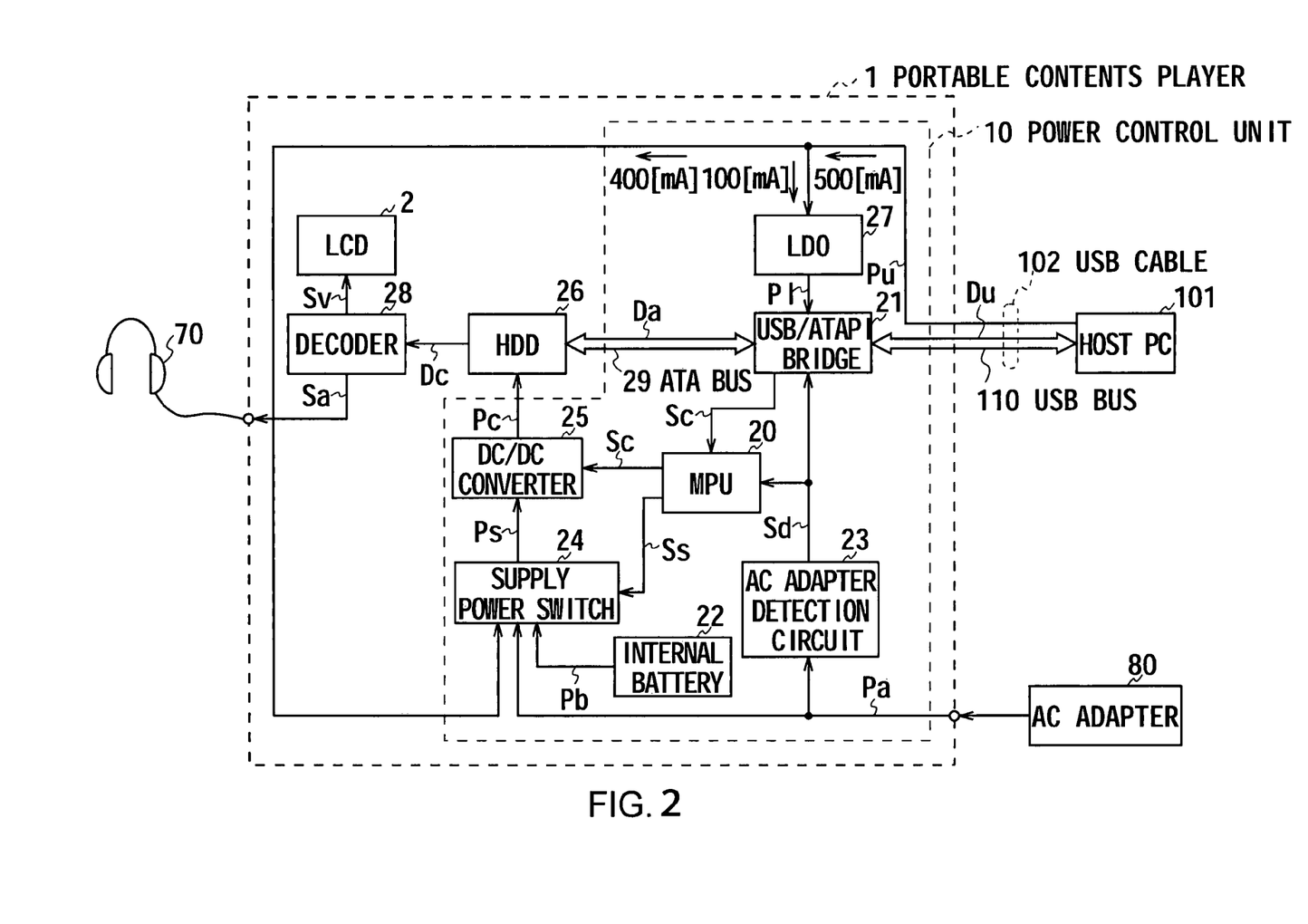
FIG. 2 is a block diagram showing the circuit configuration of a portable contents player.

The circuit configuration of the portable contents player 1 will next be described with reference to FIG. 2. In the portable contents player 1, a power control unit 10 controls the power in whole, a Micro Processing Unit (MPU) 20 controls the entire circuit. At any time, the MPU 20 operates with power supplied from an internal battery 22.

When being connected to the portable contents player 1, an AC adapter 80 supplies an AC adapter detection circuit 23 and a supply power switch 24 with AC adapter power Pa (first power) of 5V.

The AC adapter detection circuit 23 detects whether the AC adapter 80 is connected, and sends an AC adapter detection signal Sd representing the detection result to the MPU 20 and a USB/AT Attachment Packet Interface (ATAPI) bridge 21.

At the reception of a contents reproduction operation from a user in "waiting mode" in which the portable contents player 1 is in a waiting state, the MPU 20 switches the operation mode to "reproduction mode", generates a supply power switch signal Ss according to the AC adapter detection signal Sd, and sends the signal Ss to the supply power switch 24 while sending a device power control signal Sc to a DC/DC converter 25.

According to the supply power switch signal Ss, the supply power switch 24 selects the AC adapter power Pa when the AC adapter 80 is connected, and selects the battery power Pb from the internal battery 22 when the AC adapter 80 is not connected. The supply power switch 24 then supplies the DC/DC converter 25 with the selected Ac adapter power Pa or battery power Pb as selected power Ps.

The reception of the device power control signal Sc from the MPU 20 activates the DC/DC converter 25. The DC/DC converter 25 then converts the voltage of the selected power Ps supplied from the supply power switch 24 from 5V to 3.3V, and supplies a hard disk drive 26 with the converted power Pc.

The reception of the converted power Pc from the DC/DC converter 25 activates the hard disk drive 26. The hard disk drive 26 then operates, sequentially reads out contents data Dc specified by the MPU 20, and sends the read out contents data to a decoder 28.

The decoder 28 sequentially decodes the contents data Dc acquired from the hard disk drive 26 and performs predetermined digital-to-analog conversion, then sends a video signal Sv to a Liquid Crystal Display (LCD) 2 to have the LCD 2 display a video picture, as well as sends an audio signal Sa to an external headphones 70 to have the headphones 70 output a sound.

As described above, in "reproduction mode", the portable contents player 1 operates the hard disk drive 26 with power supplied from the AC adaptor 80 or internal battery 22 to read out the contents data Dc from the hard disk drive 26 and to reproduce the data.

In contrast, when detecting the connection establishment with the host PC 101 by means of the USB cable 102, the MPU 20 of the portable contents player 1 switches the operation mode to "USB connection mode" and sends an activation instruction to the USB/ATAPI bridge 21.

The portable contents player 1 supplies a Low Drop Out (LDO) regulator 27 and the supply power switch 24 with the USB power Pu, as second power, supplied from the host PC 101 through the USB cable 102.

The LDO regulator 27 drops the voltage of the USB power Pu from 5V to 3.3V and generates an LDO power Pl, then supplies the USB/ATAPI bridge 21 with the LDO power Pl.

What the LDO regulator 27 conducts here is to limit the USB power Pu supplied from the host PC 101 through the USB cable 102 to 100 mA, which is required for the operation of the USB/ATAPI bridge 21, and to pass the 100 mA current to the USB/ATAPI bridge 21.

The USB/ATAPI bridge 21 starts-up with the activation instruction from the MPU 20 after the reception of the LDO power Pl from the LDO regulator 27, and configures the condition of the USB data transfer between the portable contents player 1 and host PC 101 through a USB bus 110 to enable the data transfer with the host PC 101.

The USB/ATAPI bridge 21 further sends the device power control signal Sc for activating the DC/DC converter 25 to the MPU 20. The MPU 20 relays the device power control signal Sc without modification to the DC/DC converter 25.

In response to the AC adapter detection signal Sd, the MPU 20 generates the supply power switch signal Ss and sends it to the supply power switch 24.

According to the supply power switch signal Ss, the supply power switch 24 selects the AC adapter power Pa when the AC adapter 80 is connected, and selects the USB power Pu when the AC adapter 80 is not connected. The supply power switch 24 then supplies the DC/DC converter 25 with the selected Ac adapter power Pa or USB power Pu as selected power Ps.

USB specifications support power maximum 500 mA/5V per port. Accordingly, when switched to the USB power Pu, the supply power switch 24 receives 400 mA, which is the remaining of 500 mA of the USB power Pu from the host PC 101 through the USB cable 102 less 100 mA applied to the LDO regulator 27.

In "USB connection mode", the supply power switch 24 does not use the battery power Pb from the internal battery 22, and operates with the AC adapter power Pa only or USB power Pu only, which preserves the battery power Pb of the internal battery 22 to extend reproducible time period in "reproduction mode" as much as possible.

The device power control signal Sc from the MPU 20 activates the DC/DC converter 25. The DC/DC converter 25 then converts the 5V of the selected power Ps supplied from the supply power switch 24 to 3.3V, and supplies the hard disk drive 26 with the converted power Pc.

At the recognition of the activation of the hard disk drive 26, the USB/ATAPI bridge 21 sets the data transfer mode of an ATA bus 29 according to the connection state of the AC adapter 80 (as will hereinafter be described in detail).

A plurality of modes such as Ultra Direct Memory Access (DMA) mode 4 (66 MB/sec), Multiword DMA mode 1 (11.9 MB/sec), and the like are available as the data transfer mode of the ATA bus 29.

Thereafter, the USB/ATAPI bridge 21 acquires USB data Du transferred from the host PC 101 through the USB bus 110, performs an inter-conversion between the USB data Du and ATA data Da, and transfers the ATA data Da to the hard disk drive 26 through ATA bus 29 on which the data transfer mode has been set. The ATA data Da is accordingly written into the hard disk drive 26.

As described above, when connected with the host PC 101 by means of the USB cable 102, the portable contents player 1 switches to "USB connection mode", in which the portable contents player 1 switches the supply power switch 24 according to the connection state of the AC adapter 80 to activate the hard disk drive 26, sets a data transfer mode between the USB/ATAPI bridge 21 and hard disk drive 26, and receives the data transfer from the host PC 101.

(3) Setting of Data Transfer Mode

As described above, when unconnected with the AC adapter 80 in "USB connection mode", the portable contents player 1 needs to operate its entire system with the USB power Pu only.

In this state of the portable contents player 1, of the total supply current of 500 mA of the USB power Pu, 100 mA flows in the LDO regulator 27, and the residual 400 mA flows in the supply power switch 24.

However, when receiving data transfer from the host PC 101, the hard disk drive 26 needs to constantly rotate the internal hard disk as well as to frequently perform a seek operation of the magnetic head, and further, to perform a predetermined data reading process/data writing process, which results in an increased power consumption. Therefore, it is possible that the 400 mA of the USB power Pu applied to the supply power switch 24 is not enough for the entire operation.

To cope with this problem, when the AC adapter 80 is not connected, the USB/ATAPI bridge 21 sets the data transfer mode between the USB/ATAPI bridge 21 and hard disk drive 26 on the ATA bus 29, not to Ultra DMA mode 4 (66 MB/s) of the highest speed, but to Multiword DMA mode 1 (11.9 MB/s) purposely.

The lowered data transfer rate reduces the frequency of data reading process/data writing process as well as the frequency of the seek operation of the magnetic head, thereby the hard disk drive 26 significantly reduces its power consumption.

In the hard disk drive 26, in practice, a large amount of power has been measured for a signal demodulation process at the data reading time, which means that the reduction in the frequency of data reading process contributes to significant power consumption reduction.

The measurement of the total current consumption of the portable contents player 1 for each data transfer mode shows that Multiword DMA mode 1 is the fastest data transfer mode under the current consumption limitation of maximum 500 mA.

As a result, the hard disk drive 26 can operate with 400 mA out of the USB power Pu applied to the supply power switch 24, and accordingly the portable contents player 1 can operate with the USB power Pu of maximum 500 mA.

In contrast, when the AC adapter 80 is connected to the portable contents player 1 in "USB connection mode", sufficient AC adapter power Pa is supplied from the AC adapter 80 to the hard disk drive 26. Therefore, the data transfer rate on the ATA bus 29 is set highest (Ultra DMA mode 4) to shorten the time for data transfer as much as possible.

Once the data transfer mode is set and the data transfer starts, the USB/ATAPI bridge 21 of the portable contents player 1 does not change the data transfer mode even when the connection state of the AC adaptor 80 is changed.

(4) Procedure of Data Transfer Process

The data transfer procedure after the set of the data transfer rate on the ATA bus 29, in which the portable contents player 1 performs data transfer with the host PC 101, will next be described with reference to flowcharts of FIGS. 3 and 4.

Switch of the operation mode from immediately preceding "reproduction mode" or "USB connection mode" to "waiting mode" brings the MPU 20 of the portable contents player 1 to enter a start step of routine RT1 and move to step SP1.

In step SP1, the MPU 20 of the portable contents player 1 determines whether USB connection with the host PC 101 has been established by means of the USB cable 102. With a negative result, the MPU 20 returns to step SP1 and continues repeating the process of step SP1 in "waiting mode" until the USB connection with the host PC 101 is established.

On the other hand, with an affirmative result in step SP1, which means that the portable contents player 1 needs to receive the data transfer from the host PC 101 since the USB connection with host PC 101 has been established, the MPU 20 of the portable contents player 1 switches the operation mode to "USB connection mode" and moves to step SP2.

In step SP2, the MPU 20 of the portable contents player 1 sends an activation instruction to the USB/ATAPI bridge 21 that has received the LDO power Pl from the LDO regulator 27 to activate the USB/ATAPI bridge 21, and moves to step SP3.

In step SP3, the USB/ATAPI bridge 21 of the portable contents player 1 starts predetermined configuration processes with the host PC 101 through the USB cable 102, and moves to step SP4.

At this time, the MPU 20 sends the supply power switch signal Ss according to the AC adapter detection signal Sd to have the supply power switch 24 select the AC adapter power Pa or battery power Pb and send the selected power to the DC/DC converter 25 as the selected power Ps.

In step SP4, the USB/ATAPI bridge 21 determines whether the configuration processes with the host PC 101 has been completed. With a negative result, the USB/ATAPI bridge 21 returns to step SP4 and continues repeating the process of step SP4 until the configuration process is completed.

On the other hand, with an affirmative result in step SP4, the USB/ATAPI bridge 21 moves to step SP5 in order to proceed with the preparation of data transfer process.

In step SP5, the USB/ATAPI bridge 21 sends the device power control signal Sc to the DC/DC converter 25 through the MPU 20 and supplies the hard disk drive 26 with the converted power Pc generated by the DC/DC converter 25 to bring the hard disk derive 26 into operation. After that, the USB/ATAPI bridge 21 moves to step SP6 (FIG. 4).

In step SP6, the USB/ATAPI bridge 21 determines whether the AC adapter 80 has been connected to the portable contents player 1 according to the AC adapter detection signal Sd from the AC adapter detection circuit 23. With an affirmative result, which means that sufficient AC adapter power Pa is being supplied to the portable contents player 1 through the AC adapter 80, the USB/ATAPI bridge 21 moves to step SP7 in order to set the highest data transfer rate on the ATA bus 29.

In step SP7, the USB/ATAPI bridge 21 sets the data transfer mode on the ATA bus 29 with the hard disk drive 26 to Ultra DMA mode 4 and moves to step SP8.

In step SP8, based on a user's operation through the host PC 101, the USB/ATAPI bridge 21 receives the USB data Du from the host PC 101, performs interconversion between the USB data Du and ATA data Da, and transfers the ATA data Da to the hard disk drive 26 without changing the set data transfer mode (Ultra DMA mode 4). After that, the USB/ATAPI bridge 21 moves to step SP9.

At this time, the hard disk drive 26 operates with the AC adapter power Pa, which allows normal data transfer performance in Ultra DMA mode 4 that requires a relatively large amount of power.

In step SP9, the USB/ATAPI bridge 21 determines whether the USB connection with the host PC 101 has been disconnected. With a negative result, which means continuing data transfer with the host PC 101, the USB/ATAPI bridge 21 returns to step SP8 and continues receiving the data transfer.

On the other hand, with an affirmative result in step SP9, which means that the USB connection with the host PC 101 is disconnected by, for example, an operation of unplugging the USB cable, the USB/ATAPI bridge 21 moves to step SP13 in order to end the operation in "USB connection mode" of the portable contents player 1.

In step SP6, with a negative result, which means that the portable contents player 1 needs to be operated with the USB power Pu only since the AC adapter 80 is not connected, the USB/ATAPI bridge 21 moves to step SP10 in order to lower the data transfer rate so as to reduce the power consumption of the hard disk drive 26.

In step SP10, the USB/ATAPI bridge 21 sets the data transfer mode on the ATA bus 29 to Multiword DMA mode 1 and moves to step SP11.

In step SP11, based on a user's operation through the host PC 101, the USB/ATAPI bridge 21 receives the USB data Du from the host PC 101, performs interconversion between the USB data Du and ATA data Da, and transfers the ATA data Da to the hard disk drive 26 without changing the set data transfer mode (Multiword DMA mode 1). After that, the USB/ATAPI bridge 21 moves to step SP12.

At this time, although the hard disk drive 26 receives the USB power Pu limited to 400 mA, the data transfer can be performed normally since the hard disk drive 26 operates in Multiword DMA mode 1 that requires a relatively small amount of power.

In step SP12, the USB/ATAPI bridge 21 determines whether the USB connection with the host PC 101 has been disconnected. With a negative result, which means that the player 1 continues to receive the data transfer from the host PC 101, the USB/ATAPI bridge 21 returns to step SP11 and continues receiving the data transfer.

On the other hand, with an affirmative result in step SP12, which means that the USB connection between the portable contents player 1 and host PC 101 is disconnected by, for example, an operation of unplugging the USB cable 102, the USB/ATAPI bridge 21 moves to step SP13 in order to end the operation in "USB connection mode" of the portable contents player 1.

In step SP13, the MPU 20 of the portable contents player 1 performs a predetermined process for turning off power sources of the circuits in the portable contents player 1 other than the MPU 20 to switch the operation mode from "USB connection mode" to "waiting mode". After that, the MPU 20 returns to step SP1 and stands by for the USB connection.

When the operation mode is switched to "reproduction mode" by a user's operation, the MPU 20 of the portable contents player 1 stops the routine RT1 and performs a predetermined contents reproduction process.

(5) Operation and Effect

In the above configuration, when recognizing that the portable contents player 1 and host PC 101 have been connected by means of the USB cable 102, the MPU 20 of the portable contents player 1 switches the operation mode to "USB connection mode" to bring the USB/ATAPI bridge 21 into operation and have the supply power switch 24 select the AC adapter power Pa or USB power Pu based on the AC adapter detection signal Sd, and brings the hard disk drive 26 into operation with the converted power Pc from the DC/DC converter 25.

At this time, the USB/ATAPI bridge 21 of the portable contents player 1 sets the data transfer mode on the ATA bus 29 to Multiword DMA mode 1 when the AC adapter 80 is not connected, and sets the data transfer mode on the ATA bus 29 to Ultra DMA mode 4 when the AC adapter 80 is connected.

Therefore, when the AC adapter 80 is not connected in "USB connection mode", the portable contents player 1 sets the data transfer mode on the ATA bus 29 to Multiword DMA mode 1 to lower the data transfer rate, thereby reducing power consumption of the hard disk drive 26. Thus, the entire system of the portable contents player 1 can operate within the range of the USB power Pu, so that the player 1 can receive the data transfer from the host PC 101.

At this time, the portable contents player 1 sets the data transfer mode of the ATA bus 29 to Multiword DMA mode 1 to make the data transfer rate highest under the limitation that the operation of the portable contents player 1 is allowed with the USB power Pu only.

Further, the USB/ATAPI bridge 21 of the portable contents player 1 can adjust the data transfer rate to a desired rate simply by switching the data transfer modes on the ATA bus 29 that is previously defined by ATA specifications, eliminating the need to perform a complicated control for finely adjusting the data transfer mode. As a result, extra power need not be consumed for obtaining a desired transfer rate.

In contrast, when the AC adapter 80 is connected, the portable contents player 1 sets the data transfer mode of the ATA bus 29 to Ultra DMA mode 4 in which the highest data transfer rate is achieved, which allows a normal operation of the hard disk drive 26 with sufficient AC adapter power Pa while reducing the time for the data transfer as much as possible.

As a result, in the portable contents player 1, the data transfer mode of the ATA bus 29 can automatically be set by the USB/ATAPI bridge 21 according to the detection result of the AC adapter detection circuit 23 indicating whether the AC adapter 80 is connected or not, eliminating the need for a user to manually change the data transfer mode.

At this time, the portable contents player 1 can adequately set one of the data transfer modes according to the detection result of the AC adapter 80 so that the highest data transfer rate can be achieved within the range that the hard disk drive 26 can operate normally.

According to the above configuration, when the AC adapter 80 is not connected to the portable contents player 1 in a state where the USB connection is established between the portable contents player 1 and host PC 101, the portable contents player 1 sets the data transfer mode of the ATA bus 29 to Multiword DMA mode 1 to reduce power consumption of the hard disk drive 26, with the result that the operation of the portable contents player 1 is allowed within the range of the USB power Pu.

(6) Other Embodiments

In the above embodiment, the portable contents player 1 does not monitor the connection state of the AC adapter 80 after the player 1 has been USB connected to the host PC 101. However, the present invention is not limited to this, and the portable contents player 1 may monitor the connection state of the AC adapter 80 after the establishment of the USB connection, and switch the power supply source of the hard disk drive 26 in accordance with a change in the connection state of the AC adapter 80.

Figure 3:
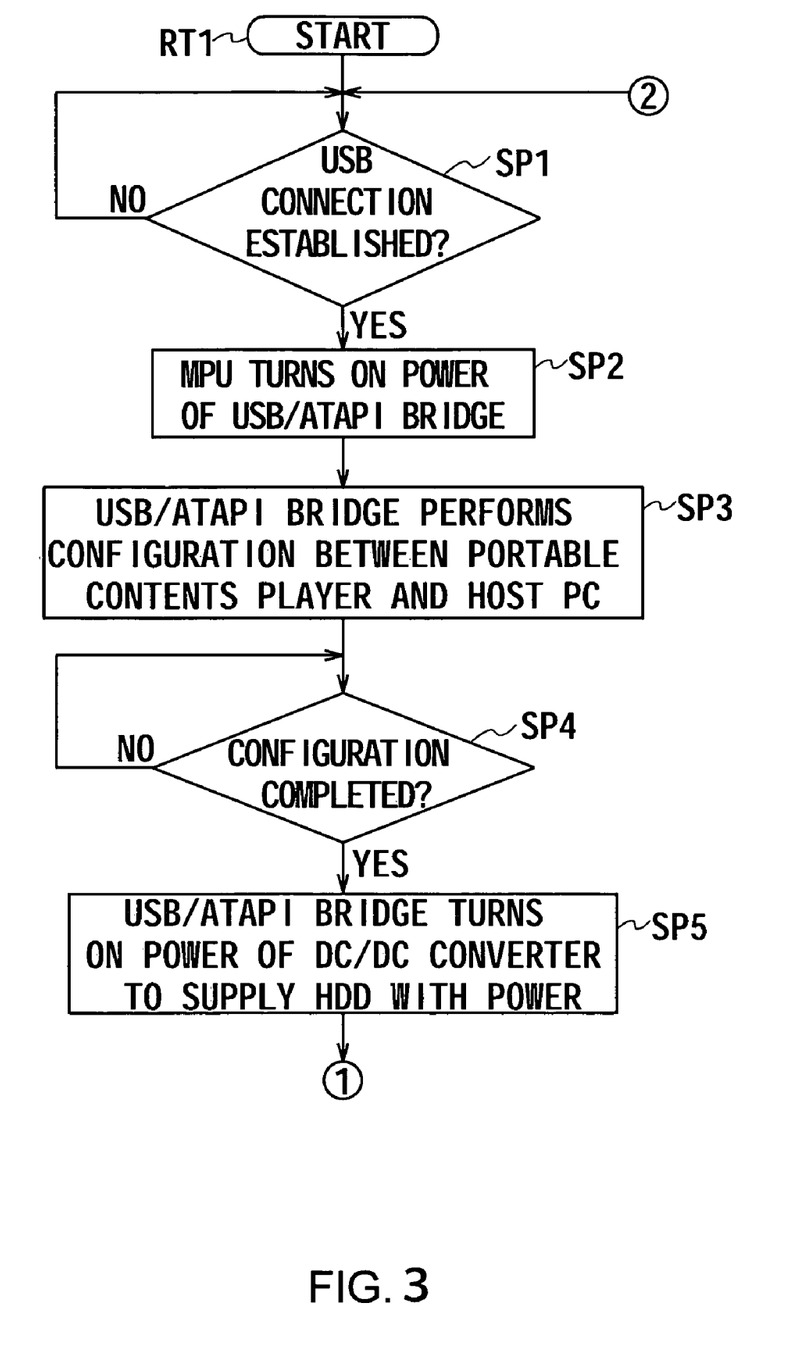
FIG. 3 is a flowchart showing the procedure of data transfer process (1)
Figure 4:
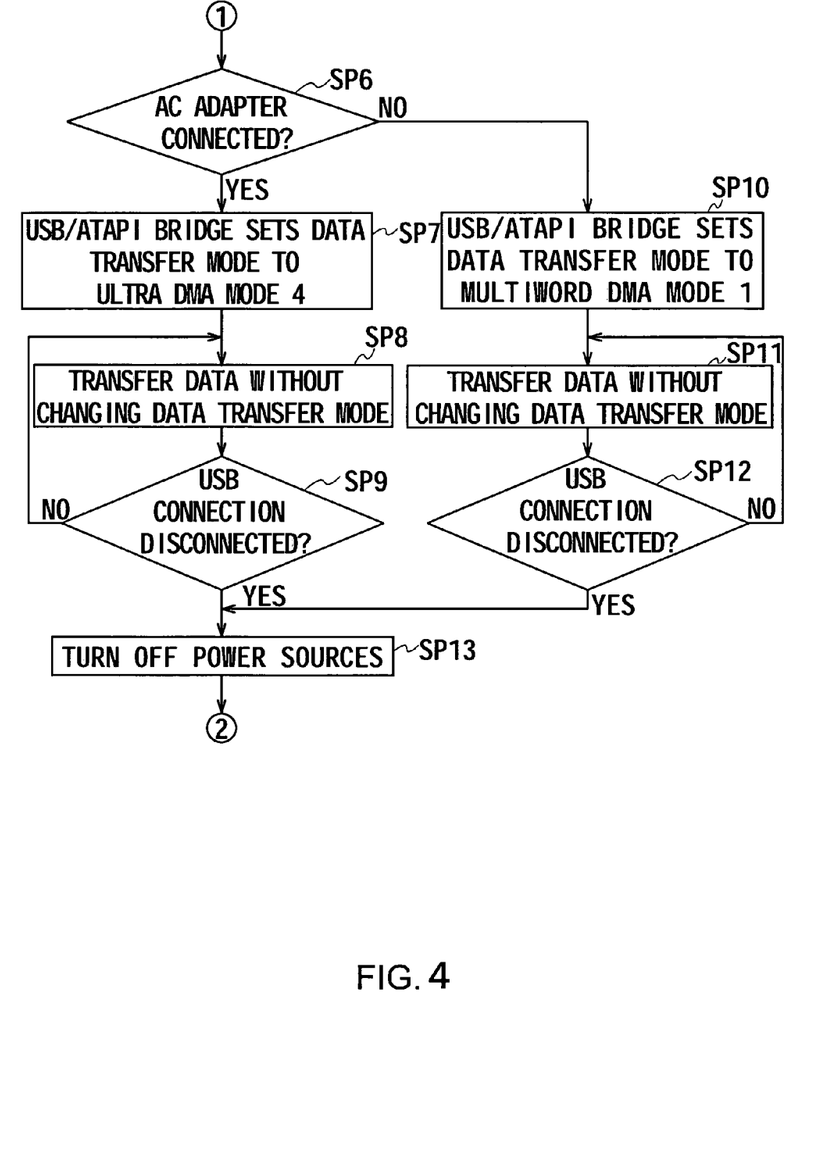
FIG. 4 is a flowchart showing the procedure of data transfer process (2)
Figure 5:
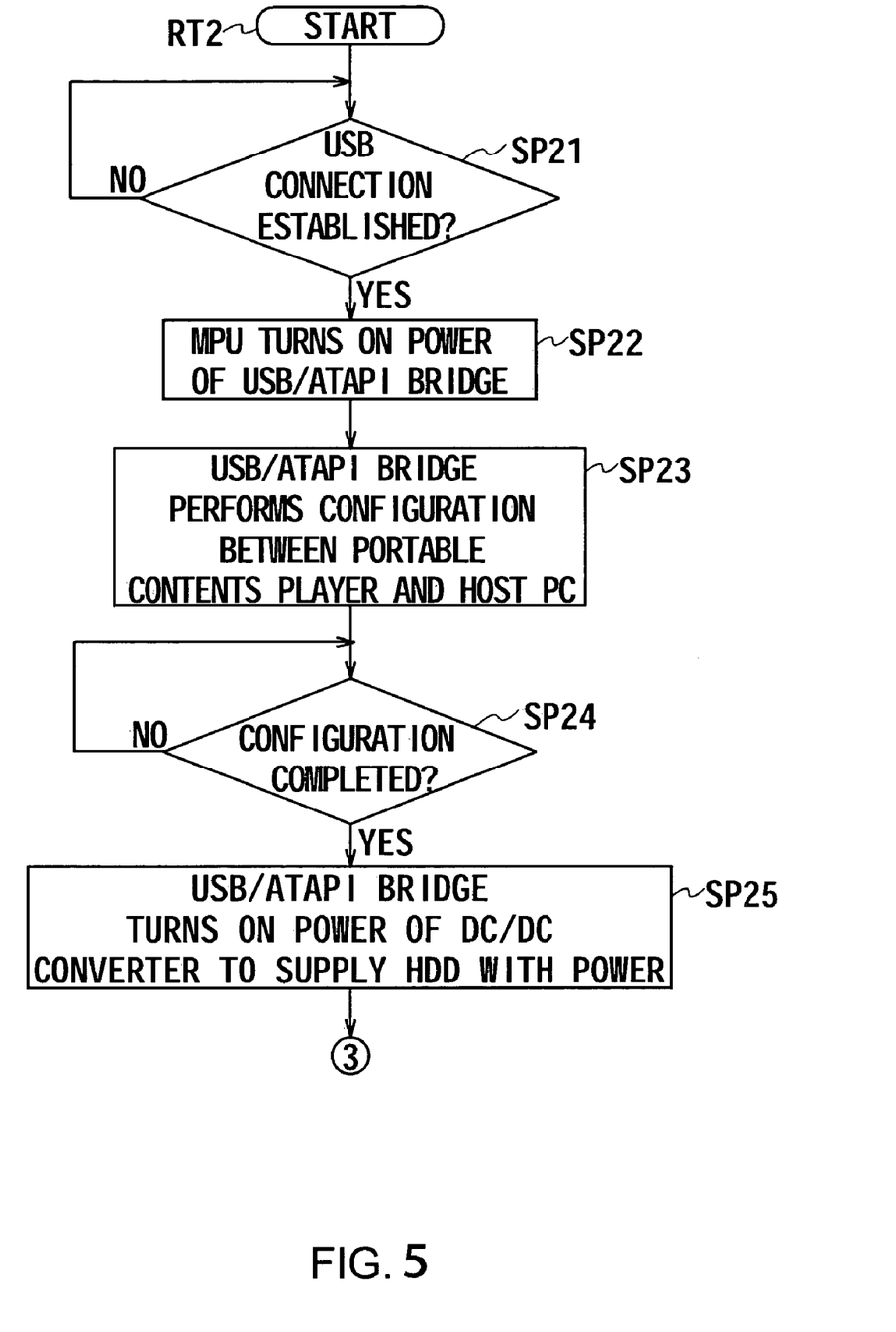
FIG. 5 is a flowchart showing the procedure of data transfer process (1) according to another embodiment.
Figure 6:
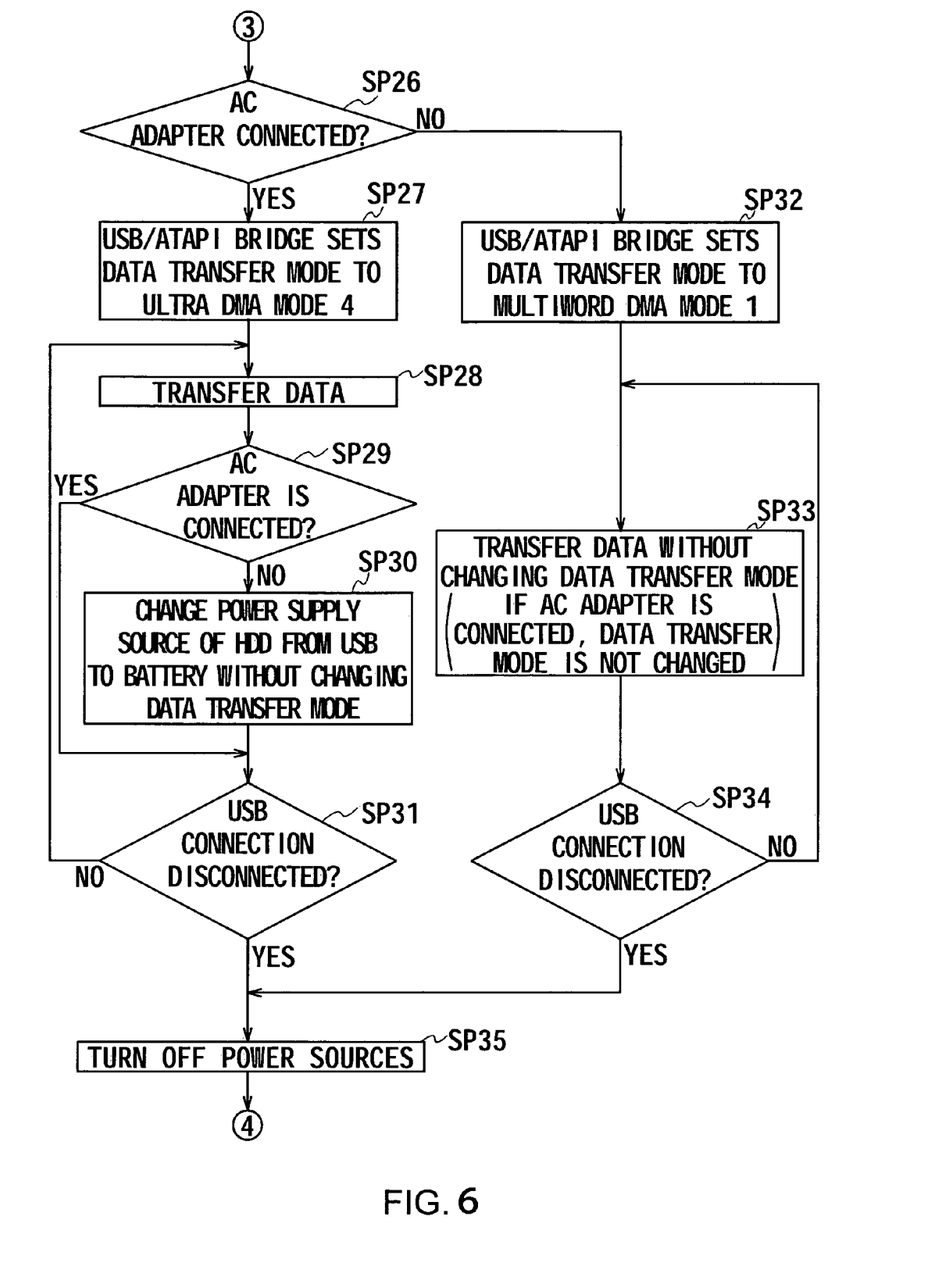
FIG. 6 is a flowchart showing the procedure of data transfer process (2) according to another embodiment.

In this case, the data transfer process is performed according to the procedure shown in flowcharts of FIGS. 5 and 6 that correspond to FIGS. 3 and 4, respectively. The procedure of the data transfer process at this time will be described below.

As is the case with the routine RT1 (FIGS. 3 and 4), the MPU 20 of the portable contents player 1 switches the operation mode from other operation modes to "waiting mode", to thereby enter start step of routine RT2 and moves to step SP21.

After that, the MPU 20 and USB/ATAPI bridges 21 of the portable contents player 1 performs processes of steps SP21 to SP27 in the same manner as the aforementioned processes of steps SP1 to SP7 to switch the operation mode to "USB connection mode", perform configuration processes between the player 1 and host PC 101, and set the data transfer mode of the ATA bus 29 to Ultra DMA mode 4 when the AC adapter 80 is connected. Subsequently, the flow moves to step SP28.

In step SP28, the USB/ATAPI bridge 21 receives the USB data Du from the host PC 101, performs interconversion between the USB data Du and ATA data Da, and transfers the ATA data Da to the hard disk drive 26. After that, the USB/ATAPI bridge 21 moves to step SP29.

In step SP29, the USB/ATAPI bridge 21 determines whether the AC adapter 80 is still being connected to the portable contents player 1 at this time point based on the AC adapter detection signal Sd. When obtaining the negative result, which means that the AC adapter 80 is unplugged to stop the supply of the AC adapter power Pa to the hard disk drive 26, the USB/ATAPI bridge 21 moves to step SP30 in order to supply the hard disk drive 26 with the battery power Pb in place of the AC adapter power Pa.

In step SP30, the USB/ATAPI bridge 21 does not change the data transfer mode of the ATA bus 29 from Ultra DMA mode 4. The MPU 20 sends the supply power switch signal Ss to the supply power switch 24 to switch the power supply source of the hard disk drive 26. The flow then advances to step SP31.

With the above processes, the portable contents player 1 allows the hard disk drive 26 that may run short of power only with the USB power Pu to operate normally while the data transfer mode of the ATA bus 29 is maintained in Ultra DMA mode 4, so that the hard disk drive 26 can ongoingly receive the data transfer from the host PC 101.

When obtaining the affirmative result in step SP29, which means that the AC adapter power Pa is continued to be supplied from the AC adapter 80, the USB/ATAPI bridge 21 moves to step SP31.

In step SP31, the USB/ATAPI bridge 21 determines whether the USB connection between the portable contents player 1 and host PC 101 has been disconnected in the same manner as step SP9. When obtaining the negative result, the USB/ATAPI bridge 21 returns to step SP28 and continues to perform the data transfer. When obtaining the affirmative result, the USB/ATAPI bridge 21 moves to step SP35 in order to end the data transfer between the portable contents player 1 and host PC 101.

When obtaining the negative result in step SP26, which means that the portable contents player 1 needs to be operated only with the USB power Pu since the AC adapter 80 is not connected to the player 1, the USB/ATAPI bridge 21 moves to step SP32 to set the data transfer mode of the ATA bus 29 to Multiword DMA mode 1 as is the case with step SP10 and moves to step SP33.

In step SP33, the USB/ATAPI bridge 21 receives the USB data Du from the host PC 101, performs interconversion between the USB data Du and ATA data Da, and transfers the ATA data Da to the hard disk drive 26 without changing the set data transfer mode (Multiword DMA mode 1). After that, the USB/ATAPI bridge 21 moves to step SP34.

Incidentally, when the AC adopter 80 is connected during the data transfer, the MPU 20 sends the supply power switch signal Ss to the supply power switch 24 to switch the power supply source from the USB power Pu to AC adapter power Pa. At this time, however, the USB/ATAPI bridge 21 does not change the data transfer mode of the ATA bus 29. As a result, it is possible to stably continue the data transfer.

In step SP34, the USB/ATAPI bridge 21 determines whether the USB connection between the portable contents player 1 and host PC 101 has been disconnected in the same manner as step SP12. When obtaining the negative result, the USB/ATAPI bridge 21 returns to step SP33 and continues the data transfer. On the other hand, when obtaining the affirmative result, the USB/ATAPI bridge 21 moves to step SP35.

In step SP35, the MPU 20 of the portable contents player 1 turns off power sources of the circuits in the portable contents player 1 other than the MPU 20 in the same manner as step SP13 to switch the operation mode to "waiting mode". After that, the MPU 20 returns to step SP21 and stands by for the USB connection.

As a result, even when the AC adapter 80 is connected after the start of the data transfer by means of the USB connection, the portable contents player 1 does not change the data transfer mode of the ATA bus 29 from Multiword DMA mode 1. As a result, it is possible to stably continue the data transfer.

The MPU 20 of the portable contents player 1 switches the power supply source of the hard disk drive 26 to the battery power Pb to operate the hard disk drive 26 only with the battery power Pb in step SP30. Alternatively, however, the MPU 20 may change the power supply source to the USB power Pu and allow the battery power Pb to make up a shortfall. This configuration can reduce power consumption of the internal battery 22.

Further, in the above embodiment, the present invention is applied to the portable contents player 1. However, the present invention is not limited to this, and can be applied to a portable hard disk device having no contents reproduction function.

Figure 7:
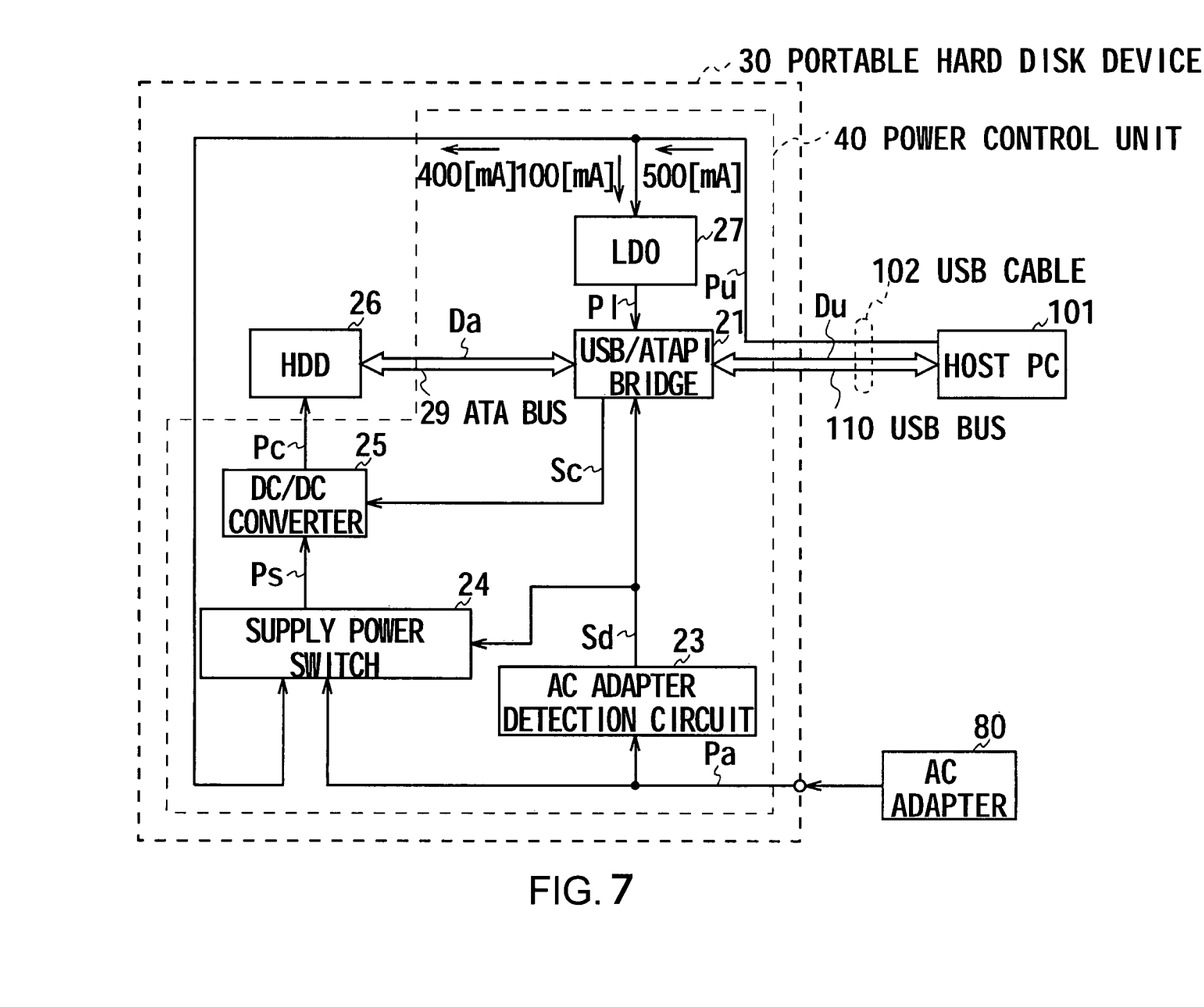
FIG. 7 is a block diagram showing the circuit configuration of a portable hard disk drive according to another embodiment.

For example, as shown in FIG. 7, a portable hard disk device 30 has the same circuit configuration as that of the portable contents player 1 (FIG. 2) except that the MPU 20, internal battery 22, decoder 28, and LCD 2 and the like are omitted.

The portable hard disk device 30 controls the entire power system by means of the power control unit 40. When the hard disk device 30 and host PC 101 are connected to each other through the USB cable 102, the USB power Pu that is supplied from the host PC 101 through the USB cable 102 is supplied to the LDO regulator 27.

When being activated by receiving the LDO power Pl from the LDO regulator 27, the USB/ATAPI bridge 21 recognizes the presence/absence of the AC adapter 80 based on the AC adapter detection signal Sd from the AC adapter detection circuit 23 and sends the device power control signal Sc to the DC/DC converter 25.

The supply power switch 24 selects the AC adapter power Pa or USB power Pu based on the AC adapter detection signal Sd from the AC adapter detection circuit 23 and supplies the DC/DC converter 25 with the selected AC adapter power Pa or USB power Pu as the selected power Ps.

The DC/DC converter 25 receives the device power control signal Sc from the USB/ATAPI bridge 21 to start operating, converts the voltage of the selected power Ps supplied from the supply power switch 24 from 5V to 3.3V, and supplies the hard disk drive 26 with the converted power Pc to bring the same into operation.

The USB/ATAPI bridge 21 recognizes the activation of the hard disk drive 26 at this time. The USB/ATAPI bridge 21 then sets the data transfer mode of the ATA bus 29 to Ultra DMA mode 4 (66 MB/sec) when the AC adapter 80 is connected and sets Multiword DMA mode 1 (11.9 MB/sec) when the AC adapter 80 is not connected.

Thereafter, the USB/ATAPI bridge 21 receives the USB data Du from the host PC 101 through the USB bus 110, performs interconversion between the USB data Du and ATA data Da, and transfers the ATA data Da to the hard disk drive 26 through the ATA bus 29 in which the data transfer mode has been set.

As described above, like the portable contents player 1 in "USB connection mode", the portable hard disk device 30 sets the data transfer mode on the ATA bus 29 to Ultra DMA mode 4 or Multiword DMA mode 1 according to the presence/absence of the AC adapter 80, so that the highest data transfer rate can be achieved within the range that the hard disk drive 26 can operate normally with the supplied AC adapter power Pa or USB power Pu.

Still further, in the above embodiment, when the AC adapter 80 is not connected to the portable contents player 1, Multiword DMA mode 1 is set as the data transfer mode of the ATA bus 29. However, this invention is not limited to this, and other data transfer modes can be set.

The power consumption of the hard disk drive 26 actually varies between manufacturers or models. Further, the power consumption of other circuits in the portable contents player 1 varies depending on the components applied.

Under the circumstances, the actual consumption current of the entire system of the portable contents player 1 is measured for each data transfer mode set in the ATA bus 29 to previously determine the highest data transfer mode that can reduce the consumption current to not more than 500 mA. Then the determined data transfer mode is set for the hard disk drive 26 in the case where the portable contents player 1 operates within the range of the USB power Pu (5V/500 mA).

As a result, even when the AC adapter 80 is not connected, the portable contents player 1 can perform the data transfer reliably with the USB power Pu only.

Still further, in the above embodiment, when the AC adapter 80 is connected to the portable contents player 1, Ultra DMA mode 4 (66 MB/sec) is set in the ATA bus 29 However, the present invention is not limited to this, and the highest data transfer mode that the hard disk drive 26 and USB/ATAPI bridge 21 are both complied with, such as Ultra DMA mode 5 (100 MB/sec) or Ultra DMA mode 2 (33 MB/sec) may be set.

Still further, in the above embodiment, the portable contents player 1 and portable hard disk drive 30 receive the data transfer from the host PC 101. However, the present invention is not limited to this, and the data transfer process may be made from the portable contents player 1 or portable hard disk drive 30 to the host PC 101, or performed bi-directionally between the portable contents player 1 or portable hard disk drive 30 and host PC 101.

Still further, in the above embodiment, the hard disk drive 26 is compatible with ATAPI specification. However, the present invention is not limited to this, and the hard disk drive may be compatible with other interface specifications such as Serial ATA or Small Computer System Interface (SCSI). In this case, a Serial ATA/USB bridge and Serial ATA bus or an SCSI/USB bridge and SCSI bus may be used in place of the USB/ATAPI bridge 21 and ATA bus 29.

Still further, in the above embodiment, the hard disk drive 26 is used as a data storage means. However, it is possible to use various kinds of storage devices, such as a Compact Disc-Rewritable (CD-RW) drive, Mini Disc (MD) drive, or a semiconductor memory, that can change data transfer mode to lower the data transfer rate and thereby to reduce power consumption.

Still further, in the above embodiment, the present invention is applied to the power control unit 10 of the portable contents player 1. However, the present invention is not limited to this, and can be applied to the power control unit of various kinds of electronic apparatus, such as a Personal Digital Assistant (PDA), a digital still camera, or a mobile phone, that include a storage means and can operate only with the USB power Pu.

Still further, in the above embodiment, the USB cable 102 compatible with USB 2.0 specification is used to connect the portable contents player 1 and host PC 101. However, the present invention is not limited to this, and connection cables compatible with other specifications, such as Institute of Electrical and Electronics Engineers (IEEE) 1394 specification that can supply an electrical power, may be used.

Still further, in the above embodiment, when being connected to the host PC 101 through the USB cable 102, the portable contents player 1 performs a data transfer by means of the USB bus 110 of the USB cable 102 while receiving the USB power Pu. However, the present invention is not limited to this, and the USB cable 102 may be used only to supply the portable contents player 1 with the USB power Pu, and, for example, a serial cable may be used to connect the portable contents player 1 and host PC 101 to perform the data transfer according to other communication means such as a serial communication.

Still further, in the above embodiment, the data transfer rate on the ATA bus 29 is reduced when the portable contents player 1 is allowed to operate only with the USB power Pu. However, the present invention is not limited to this, and the data transfer rate on the ATA bus 29 may be reduced when an AC adapter that supplies a small amount of power is used, thereby reducing power consumption of the hard disk drive 26. Further, a plurality of data transfer modes can be performed depending on the level of the available power.

Still further, in the above embodiment, the power control unit 10 serving as a power controller is constituted by the AC adapter detection circuit 23 serving as a power detection means, supply power switch 24 serving as a supply power switch means, USB/ATAPI bridge 21 serving as a data transfer rate control means. However, the present invention is not limited to this, and the power controller may be constituted by the power detection means, supply power switch means, and data transfer rate control means each include other various kinds of circuits.

The present invention can be applied to various kinds of electronic apparatus, such as a portable hard disk device or PDA, having a storage means and capable of operating only with USB power.

It should be understood by those skilled in the art that various modifications, combinations, sub-combinations, alterations and variations may occur depending on design requirements and other factors insofar as they are within the scope of the appended claims or the equivalents thereof.

What is claimed is:

1. A portable contents player comprising:
  audio output means for outputting an audio signal to a set of external headphones;
  power detection means for detecting supply of a first power having a first power level and a second power having a second power level lower than the first power level;
  storage means for storing data in a storage medium;
  supply power switch means for supplying the storage means with the first power when the power detection means detects supply of the first power, and supplying the storage means with the second power after switching power from the first power to the second power when the power detection means detects supply of the second power only; and
  data transfer rate control means for setting a data transfer rate between a predetermined data transfer source or data transfer destination and the storage means to a second data transfer rate lower than a first data transfer rate when only the supply of the second power is detected, to thereby reduce power consumption of the storage means in comparison to power consumed by a data transfer performed at the first data transfer rate,
  wherein the data transfer rate control means sets the first data transfer rate before the data transfer at the first data transfer rate is started when the power detection means detects supply of the first power, and maintains the first data transfer rate even if the first power ceases to be supplied after the data transfer starts.

2. The portable contents player according to claim 1, wherein the data transfer rate control means sets the second data transfer rate before the data transfer at the second data transfer rate is started and, maintains the second data transfer rate even when the first power is supplied after the data transfer starts.

3. The portable contents player according to claim 1, wherein the data transfer rate control means sets the data transfer rate by switching among a plurality of predetermined data transfer modes.

4. The portable contents player according to claim 1, wherein the second power is supplied by means of a data communication cable used for performing a data transfer with an external device.

5. The portable contents player according to claim 4, wherein the data communication cable is a Universal Serial Bus (USB) cable and the second power is USB power.

6. A method for operating a portable contents player, comprising:
  transferring data from a data transfer source to a data storage device of the portable contents player;
  outputting an audio signal corresponding to the data to a set of external headphones;
  detecting supply of a first power having a first power level and a second power having a second power level lower than the first power level;
  supplying the data storage device with the first power when supply of the first power is detected and supplying the data storage device with the second power when only the supply of the second power is detected;
  setting a data transfer rate between the data transfer source or a data transfer destination and the data storage device to a second data transfer rate lower than a first data transfer rate when only the supply of the second power is detected, to thereby reduce power consumption of the data storage device in comparison to power consumed by a data transfer at the first data transfer rate, and
  setting the first data transfer rate before the data transfer at the first data transfer rate is started when the first power is detected, and maintaining the first data transfer rate even if the first power ceases to be supplied after the data transfer starts.

7. A portable contents player comprising:
  an audio output for outputting an audio signal to a set of external headphones;
  a power detector for detecting supply of a first power having a first power level and a second power having a second power level lower than the first power level;
  a disk drive for storing data;
  a supply power switch for supplying the disk drive with the first power when the power detection means detects supply of the first power, and supplying the disk drive with the second power after switching power from the first power to the second power when the power detector only detects supply of the second power; and
  data transfer rate controller for setting a data transfer rate between a predetermined data transfer source or data transfer destination and the disk drive to a second data transfer rate lower than a first data transfer rate when only the supply of the second power is detected, to thereby reduce power consumption of the disk drive in comparison to power consumed by a data transfer performed at the first data transfer rate,
  wherein the data transfer rate controller sets the first data transfer rate before the data transfer at the first data transfer rate is started when the power detector detects supply of the first power, and maintains the first data transfer rate even if the first power ceased to be supplied after the data transfer starts.

8. The portable contents player according to claim 7, wherein the data transfer rate controller sets the second data transfer rate before the data transfer at the second data transfer rate is started and, maintains the second data transfer rate even when the first power is supplied after the data transfer starts.

9. The portable contents player according to claim 7, wherein the data transfer rate controller sets the data transfer rate by switching among a plurality of predetermined data transfer modes.

* * * * *